Patented May 23, 1933

1,910,807

UNITED STATES PATENT OFFICE

ARTHUR L. MOHLER, OF WILMINGTON, DELAWARE, ASSIGNOR TO HERCULES POWDER COMPANY, OF WILMINGTON, DELAWARE, A CORPORATION OF DELAWARE

METHOD OF PRODUCING HYDRATED NITRATE DOUBLE SALT

No Drawing. Application filed March 4, 1930. Serial No. 433,192.

My invention relates to a method of producing hydrated nitrates, as, for example, magnesium nitrate, calcium nitrate, ferric nitrate, aluminum nitrate and the like.

Hydrated nitrates have been heretofore produced by dissolving an oxide, a carbonate, or the like, of a metal in dilute nitric acid, or by double decomposition of soluble salts of metals with water, with subsequent evaporation of the excess water until the nitrate crystallizes out from the solution. Such methods of producing hydrated nitrates involve considerable difficulty and are uneconomic since in the evaporation of the excess water the containers, steam coils, etc., are damaged by corrosion.

Now, in accordance with my invention, I have discovered that hydrated nitrates may be produced without the necessity for evaporating any substantial quantity of water, it being only necessary that the nitrate when formed be cooled to effect crystallization.

The method in accordance with my invention involves the admixture of nitric acid with a metal salt of a weak acid, as magnesium carbonate, an oxide, as magnesium oxide, or a hydroxide, as magnesium hydroxide, or the like, and which will form a nitrate, in quantity just sufficient to neutralize the nitric acid, the nitric acid being dissolved in an amount of water substantially equal to the water of crystallization of the hydrated nitrate formed by the reaction.

As an example of the carrying out of the method according to my invention, for the production say of magnesium nitrate, I may utilize magnesium oxide, magnesium hydroxide, magnesium carbonate, or other equivalent salt and since the reaction does not proceed rapidly in the cold, it is desirable that a certain amount of the heat of reaction be retained and that toward the end of the reaction the temperature be raised above the melting point of the hydrated magnesium nitrate in order to render exact neutralization easier. In carrying out my method the temperature of the reacting mass may be desirably maintained at about 150° F.-160° F. and such may be readily accomplished by control of the temperature of reaction, which normally reaches 180° F.-190° F. through cooling, for example, with a regulated flow of water. Toward the end of the reaction the temperature should be raised to say about 200° F., which may be accomplished by utilizing steam to supply the necessary additional heat.

When the reaction is complete, or in other words, when complete neutrality is attained, which may be determined by the fact that the solution turns from greenish brown to brown, or by testing with litmus, the solution is allowed to settle and is then run through a filter cloth, or the impurities otherwise removed, and any slight excess water eliminated by evaporation, after which the solution is run into a shallow crystallizing pan where on cooling it crystallizes into a hard cake of hydrated magnesium nitrate $Mg(NO_3)_2 6H_2O$, which may be ground for use.

As a more specific example of the carrying out of the method according to my invention for the production of magnesium nitrate, to fourteen liters of commercial dilute nitric acid containing 63.22% $HNO_3$, diluted with water to a concentration of 58.40% $HNO_3$, there is added, with agitation, four pounds of finely ground commercial grade magnesium oxide. The mass, the temperature of which tends to rise to 180° F.-190° F. as the magnesium oxide is added, is cooled, as by a flow of water through a suitable coil in contact with the mass, in order to maintain a temperature of about 160° F. which is held until almost all the magnesium oxide is added. When the addition of the magnesium oxide is about complete the temperature of the mass is raised to about 200° F., as by substituting steam for water in the cooling coil, at which temperature the mass is held and further finely ground magnesium oxide added slowly until neutrality is attained. The theoretical amount of magnesium oxide required for neutralization of the acid in the above example is about nine pounds and, as has been indicated, the attainment of neutrality of the mass may be determined by change in color from greenish brown to brown, or by testing with litmus.

The reaction may be set out as follows:

$$MgO + 2HNO_3 + 5H_2O = Mg(NO_3)_2.6H_2O$$

When the reaction is complete the solution or melt is permitted to settle for about five minutes and then run through a filter cloth, or the impurities otherwise removed and any slight excess water eliminated by evaporation, after which the solution is run into a shallow crystallizing pan. The hydrated magnesium nitrate will crystallize into a hard cake on cooling without the necessity for evaporating off any substantial excess of water, it being noted that substantially the amount of water required to produce the water of crystallization of hydrated magnesium nitrate ($6H_2O$) is utilized. The cake may be subsequently ground for use.

The process according to my invention may be utilized, if desired, in connection with the production of double salts, one of which is a hydrated metal nitrate, as for example, ammonium nitrate-hydrated magnesium nitrate, ammonium nitrate-hydrated calcium nitrate, and the like. In the production of double salts, for example, ammonium nitrate-hydrated magnesium nitrate, a quantity of magnesium oxide, hydroxide or carbonate, is placed in a tank and weak nitric acid, containing substantially the amount of water necessary to provide the $6H_2O$ of the magnesium nitrate to be produced, added. After the addition of the weak nitric acid, ammonia, for example, in gaseous form or in solution, and nitric acid are introduced into the tank simultaneously at different points so as to maintain almost neutrality through the course of the neutralization. During the reaction the temperature should be controlled as in the case of the production of a hydrated metal nitrate alone.

When the reaction is complete as much as may be necessary of the solution of ammonium nitrate-magnesium nitrate should be evaporated to eliminate any slight excess of water and the solution then run into a kettle having revolving agitating arms and cooling jackets in which the double salts will crystallize simultaneously. Before the evaporation of any of the solution for the elimination of any slight excess of water the insoluble impurities introduced either with the magnesium or carbonate, as silica, etc., should be settled out of the combined solution.

In the production of a double salt in accordance with my invention, I may use, for example, ammonium nitrate in place of ammonia. In proceeding with use of ammonium nitrate, since it is highly soluble, such may be added to, for example, magnesium or other metal oxide, hydroxide, carbonate, or the like, in solution in the few per cent of water in which it will dissolve and which it will pick up from the atmosphere, together with nitric acid of a strength sufficiently great to compensate for the water and bring the amount of water present down to the desired $6H_2O$ of the metal nitrate constituent of the double salt to be produced. Alternately, the ammonium nitrate may be added in solution in the nitric acid, added for the purpose of attaching and dissolving the metal salt, as magnesium carbonate, or the like, without, as will be observed, the addition of any water.

It will be understood that in accordance with my invention various hydrated nitrates other than hydrated magnesium nitrate may be produced, as indicated, by the use of, for example, an oxide, a hydroxide, a carbonate, or the like of, for example, calcium, iron, aluminum, or the like, instead of magnesium.

It will now be noted that according to the method involving my invention, I produce hydrated metal nitrates in crystalline form without the necessity for the evaporation of any substantial quantity of water and in a manner which is relatively inexpensive and at the same time productive of a product of desirable grade and characteristics.

It will be understood that where in the claims appended hereto I refer to a metal oxide, that I intend to include carbonates and hydroxides of metals as equivalents, and that where in the claims I refer to an alkali I intend to include as equivalents such compounds of alkalies as will form with weak nitric acid, alkali nitrates, e. g. alkali hydroxides, carbonates, compounds with weak acids, etc., as for example, ammonium carbonate, potassium or sodium hydroxide or carbonate, etc.

In the claims appended hereto I have not claimed the method of producing hydrated metal nitrates described herein, as such forms the subject matter of my application for United States Letters Patent filed October 1, 1927, Serial No. 223,484, which resulted in Patent No. 1,844,862, of which this application is a continuation in part.

What I claim and desire to protect by Letters Patent is:

1. The method of producing double salts including a hydrated metal nitrate, which includes subjecting magnesium oxide and ammonia to treatment with an equivalent amount of nitric acid in the presence of a quantity of water substantialy equal in amount to the water of crystallization of the metal nitrate, and cooling the solution to effect simultaneous crystallization of the double salts produced.

2. The method of producing double salts including a hydrated metal nitrate by reacting nitric acid containing water in amount equivalent to the water of crystallization in the hydrated salt, with the weak acid salt of a metal capable of forming a hydrated nitrate, adding to said solution an alkali and nitric acid in equivalent quantities simultaneously, and cooling the solution to effect crystallization of the double salt produced.

3. The method of producing double salts including a hydrated metal nitrate by reacting nitric acid containing water in amount equivalent to the water of crystallization in the hydrated salt, with an oxide of a metal capable of forming a hydrated nitrate, adding to said solution an alkali and nitric acid in equivalent quantities simultaneously, and cooling the solution to effect crystallization of the double salt produced.

4. The method of producing double salts including a hydrated metal nitrate by reacting nitric acid containing water in amount equivalent to the water of crystallization in the hydrated salt, with a hydroxide of a metal capable of forming a hydrated nitrate, adding to said solution an alkali and nitric acid in equivalent quantities simultaneously, and cooling the solution to effect crystallization of the double salt produced.

5. The method of producing double salts including a hydrated metal nitrate by reacting nitric acid containing water in amount equivalent to the water of crystallization in the hydrated salt, with the weak acid salt of a metal capable of forming a hydrated nitrate, adding to said solution alkali nitrate and cooling the solution to effect crystallization of the double salt produced.

6. The method of producing double salts including a hydrated metal nitrate by reacting nitric acid containing water in amount equivalent to the water of crystallization in the hydrated salt, with the weak acid salt of a metal capable of forming a hydrated nitrate, adding to said solution ammonium nitrate and cooling the solution to effect crystallization of the double salt produced.

In testimony of which invention, I have hereunto set my hand, at Torreon, Coahuila, Mexico, on this 12th day of February, 1930.

ARTHUR L. MOHLER.